United States Patent
Tuckey et al.

[11] Patent Number: 5,613,844
[45] Date of Patent: Mar. 25, 1997

[54] SUBMERSIBLE ELECTRONIC DRIVE MODULE

[75] Inventors: Charles H. Tuckey, Cass City; Kirk D. Doane, Bay City; Kevin L. Williams, Columbiaville, all of Mich.

[73] Assignee: Walbro Corporation, Cass City, Mich.

[21] Appl. No.: 340,115

[22] Filed: Nov. 15, 1994

[51] Int. Cl.⁶ .................................................. F04B 39/06
[52] U.S. Cl. .................. 417/366; 417/423.7; 417/410.1; 123/509
[58] Field of Search ........................ 417/410.1, 366, 417/423.8, 372, 423.7, 423.1; 123/41.31, 509

[56] References Cited

U.S. PATENT DOCUMENTS

| | | | |
|---|---|---|---|
| 4,143,488 | 3/1979 | Ade et al. | 417/366 |
| 4,307,617 | 12/1981 | Greek et al. | 73/753 |
| 4,643,653 | 2/1987 | Masaka et al. | 417/417 |
| 4,726,746 | 2/1988 | Takada et al. | 417/423.1 |
| 4,773,829 | 9/1988 | Vettori | 417/366 |
| 4,830,576 | 5/1989 | Patrick | 417/371 |
| 4,998,865 | 3/1991 | Nakanishi et al. | 417/423.7 |
| 5,092,748 | 3/1992 | Simmons, II | 417/366 |
| 5,120,201 | 6/1992 | Tuckey et al. | 417/366 |
| 5,148,792 | 9/1992 | Tuckey | 123/497 |
| 5,338,163 | 8/1994 | Frank et al. | 417/410.1 |

Primary Examiner—Timothy Thorpe
Assistant Examiner—Peter G. Korytnyk
Attorney, Agent, or Firm—Barnes, Kissele, Raisch, Choate, Whittemore & Hulbert

[57] ABSTRACT

A submersible electronic drive module for a vehicle in-tank fuel pump which includes a circuit board assembly having an input connector for receiving a current, an output connector for applying electric power to a fuel pump electric motor, and electrical components for supplying electric power to the motor as a function of vehicle fuel demand. A heat sink of a heat conductive material is thermally connected to the circuit board assembly which absorbs heat generated by the electrical components on the circuit board assembly. Fuel passes through the heat sink to cool it and thus the circuit board assembly and electrical components. A fuel-impervious casing encapsulates the drive module so that fuel is prevented from contacting the circuit board assembly and electrical components. The electronic drive module is removably attached to the fuel pump and is mounted within a fuel tank of an automotive fuel system.

12 Claims, 1 Drawing Sheet

SUBMERSIBLE ELECTRONIC DRIVE MODULE

FIELD OF THE INVENTION

This invention relates to automotive electric fuel pumps and more particularly to a submersible fuel pump electronic drive module.

BACKGROUND OF THE INVENTION

Many automotive fuel systems utilize an in-tank electric fuel pump for supplying fuel from the fuel tank to the engine. It is desirable in many fuel systems for fuel pump output pressure to vary according to engine fuel demand. This is accomplished by modulating the supply voltage through an electronic drive module to the electric motor of the fuel pump. Typically, the drive module receives a signal from a remote pressure sensor and supplies a pulse width modulated current to the pump motor having a duty cycle that varies so as to vary and maintain the necessary pump speed for supplying proper fuel pressure to the engine. Usually, the drive module includes a relatively large heat sink to dissipate to the ambient atmosphere heat generated by producing the pulsed current.

In many present fuel systems, the electronic drive module is mounted remote from the fuel pump and tank and supplies a variable electronic signal to the fuel pump electric motor through electric wires. The drive module is normally installed at the automotive assembly plant on a vehicle under-body or in a wheel well which necessitates added labor, packaging space and fasteners for mounting the module. The electric wires must be routed from the drive module to the fuel pump requiring additional labor, packaging space and fasteners to mount the wires on the vehicle body. These wires also act as an antenna for radio frequencies causing interference with the proper function of the electronic drive module.

As disclosed in U.S. Pat. Nos. 5,120,201 and 5,148,792, the electronic drive circuit components may also be constructed as a permanent, integral part of the fuel pump assembly. When the fuel pump or the electronic drive circuit fails, both would be replaced. This creates unnecessary expense and waste by requiring replacement of functional equipment.

SUMMARY OF THE INVENTION

An in-tank electronic drive module of this invention has a circuit board assembly carrying electrical components for providing a driving current to the electric motor of a fuel pump and a heat sink for dissipating heat generated by the electrical components of the circuit board to fuel passing from the fuel pump through the heat sink. The drive module is removably attached to the fuel pump and encapsulated in a fuel-impervious casing for preventing fuel within the fuel tank from contacting the electrical components of the circuit board.

Objects, features and advantages of this invention are to provide an electronic drive module for an electric fuel pump that is completely submersible in fuel, can be quickly and releaseably attached to an in-tank fuel pump, substantially reduces radio frequency interference with the drive module functions, dissipates heat to the fuel, reduces the packaging space and necessary labor required for installation, eliminates the need for body holes and fasteners, and is rugged, durable, reliable, serviceable separate from the fuel pump, and of relatively simple design and economical manufacture.

BRIEF DESCRIPTION OF THE INVENTION

These and other objects, features and advantages of this invention will be apparent from the following detailed description of the best mode, appended claims and accompanying drawings in which:

DETAILED DESCRIPTION

Figure 1:
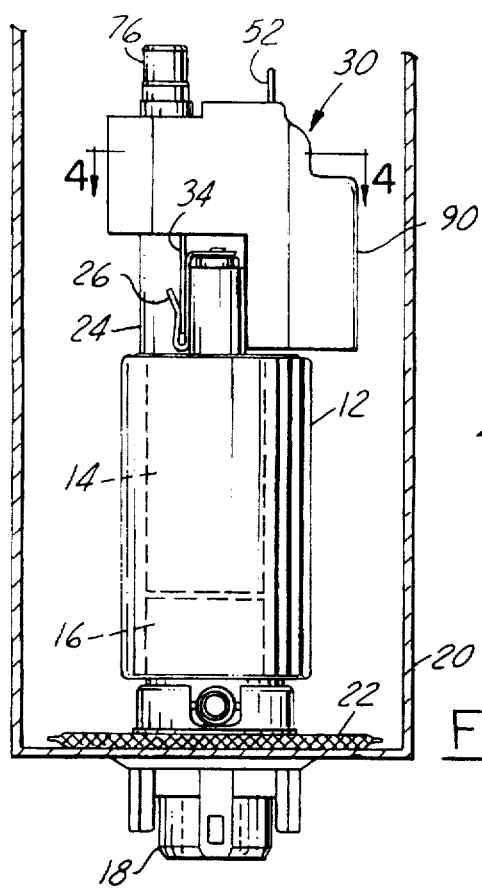
FIG. 1 is a full side view of an electric fuel pump shown with an electronic drive module embodying this invention mounted on the fuel pump.

Referring in more detail to the drawings, FIG. 1 illustrates an electric fuel pump module 10 with an external pump housing 12 containing an electric motor 14 and a pump assembly 16. At the lower end of module 10 is a fuel inlet 18 for drawing fuel from a fuel tank. For retaining a reserve amount of fuel to prevent fuel pump 16 from drawing air under low fuel level conditions within the vehicle fuel tank, electric motor 14, pump 16 and housing 12 are contained within a reservoir container 20. A fuel filter 22 rests on the bottom of container 20. Pump 16 draws fuel from the container when there is no fuel to be drawn through inlet 18. A fuel outlet 24 is located at the upper end of housing 12 for fuel delivery to an engine. Positioned at the upper end of housing 12 is an electrical connector 26 conductively connected to the electric motor within the housing 12.

An electronic drive module 30 is removably attached to the upper end of the fuel pump assembly 16 for providing a pulse width modulated (PWM) current to energize and drive the fuel pump electric motor 14. Electric output terminal 34 disposed at the lower end of drive module 30 is conductively received by electrical connector 26 of pump assembly 10 for applying the drive current to the electric motor 14.

Figure 3:
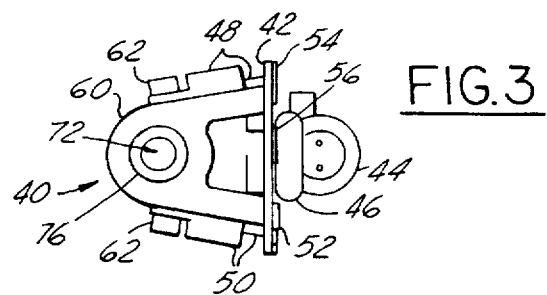
FIG. 3 is a top view of the electronic drive module components of FIG. 2 before encapsulation.
Figure 2:
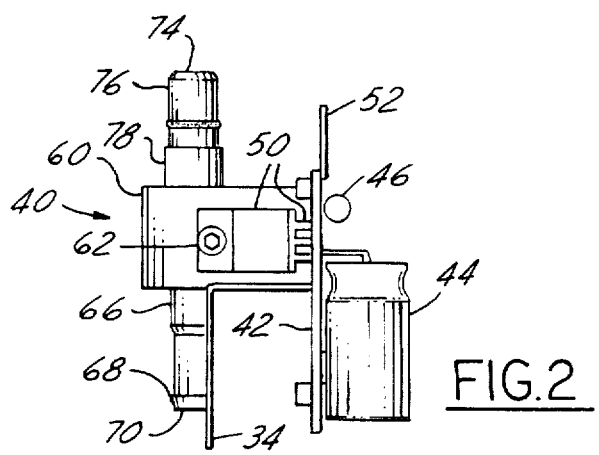
FIG. 2 is a side view of the electronic drive module components before encapsulation.

As shown in FIGS. 2 and 3, drive module 30 has a circuit board assembly 40 of a typical construction comprising electrical components including a circuit board 42, a capacitor 44, a radio frequency interference snubber resistor 46, a flyback diode 48, and a field effect transistor (FET) 50. A remote vehicle power supply energizes drive module 30 by providing a direct current through an electric terminal 52 conductively connected to circuit board assembly 40. A ground terminal 54 conductively connects drive module 30 to vehicle ground. Drive module 30 receives a current through terminal 52 and varies the speed of pump 16 by providing a PWM current to electric motor 14 through the output terminal 34. An input terminal 56 disposed between terminals 52 and 54 receives a signal from a remote pressure sensor responsive to engine fuel demand. Alternatively, the pressure sensor may be mounted in the pump housing 12 downstream of the fuel pump 16. FET 50 varies the drive voltage to motor 14 by chopping the input voltage from terminal 52 in response to the fuel demand signal from terminal 56. The unused voltage spikes are absorbed by diode 48. Heat builds up in both the diode and FET during this PWM process.

In accordance with the present invention, as shown in FIGS. 2 and 3, a heat sink 60, preferably constructed from a heat conductive material such as black annodized aluminum, is conductively connected to circuit board assembly 40. Fasteners 62 attach diode 48 and FET 50 to heat sink 60 in thermal heat transfer relationship therewith. Heat generated within the electrical components and particularily the diode and FET of circuit board assembly 40 is transferred by conduction to heat sink 60.

The heat sink has a cylindrical bore 64 passing through the heat sink essentially parallel to circuit board 42. A cylindrical tube 66 is received within bore 64 in heat conducting relationship with the sink 60 and has a fuel inlet connector 8 with a fuel inlet 70. Communicating with fuel inlet 70 through a passage 72 is a fuel outlet 74 in an outlet connector 76. Within outlet connector 76 is a one-way check valve 77 of typical construction for preventing reverse flow of fuel through passage 72. As fuel passes from inlet 70 through passage 72 to outlet 74, heat within heat sink 60 is transferred to the fuel. Fuel from outlet 74 is then delivered to the engine through a fuel line, not shown, connected to outlet connector 76.

To provide a positive stop when press fitting the outlet connector 76 into the heat sink, the connector has an enlarged diameter central portion 78 with a shoulder 80 which in assembly seats in a complimentary counterbore 84 in the heat sink. Drive module 30 is removably mounted on pump assembly 10 by fuel inlet tube 66 and connector 68 being telescopically received and sealably and releaseably retained within pump outlet 24. This also provides a fluid coupling of the tube 66 with the pump outlet 24.

Figure 4:
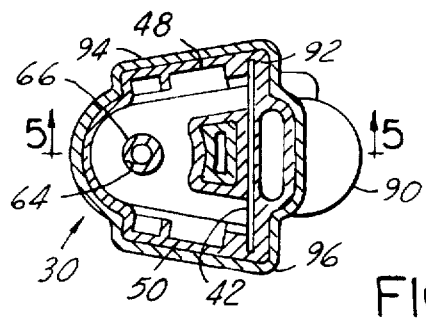
FIG. 4 is a sectional view of the electronic drive module encapsulated in a casing taken generally on line 4—4 of FIG. 1.
Figure 5:
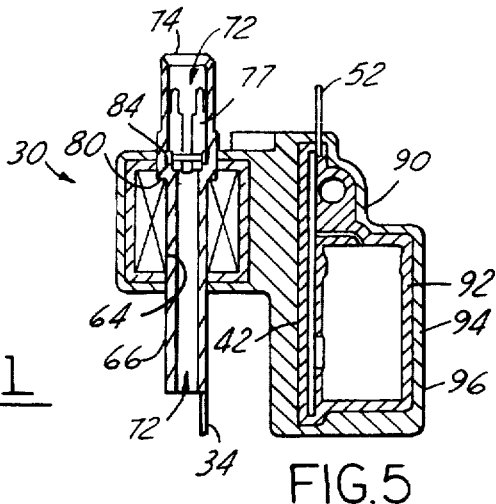
FIG. 5 is a full sectional view of the encapsulated electronic drive module taken generally on line 5—5 of FIG. 4.
Figure 7:
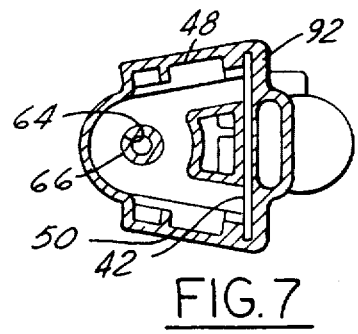
FIG. 7 is a sectional view of the electronic drive module taken generally on line 7—7 of FIG. 6.
Figure 6:
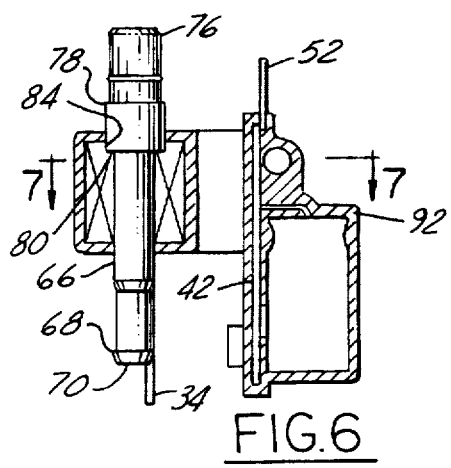
FIG. 6 is a full sectional view of the electronic drive module showing the inner layer of the casing.

In a preferred embodiment of the present invention, as shown in FIGS. 4 and 5, an outer casing 90 substantially encapsulates drive module 30. Casing 90 preferably has an inner layer 92 and an outer layer 94 constructed from two different resin materials. Inner layer 92 is preferably an epoxy in which the components are potted or coated. However, if desired, the inner layer could be an elastomeric material such as flourosilicone. As shown in FIGS. 6 and 7, inner layer 92 is molded around circuit board assembly 40 and heat sink 60 by placing them in a mold into which the elastomeric material in a liquid state is poured and allowed to cool. This also preferably secures together the heat sink 60, circuit board 42 and all its components. Inner layer 92 may be resistant to fuel contaminants and degradation and also will protect the circuit board components from damage during formation of the outer layer 94 of the casing 90.

Circuit board assembly 40 and heat sink 60 with inner layer 92 molded around the components is then placed in a mold or die in which outer layer 94 is then formed by a high pressure injection molding process. Outer layer 94 is produced by injecting into the die a thermoplastic material such as a fuel resistant nylon in a liquid state under high temperature and pressure. For some fuels, actetyl may also how sufficient fuel resistance. The thermoplastic material when cooled, forms a hard and essentially fuel-impervious protective shell around the components and inner layer 92. Outer layer 94 is essentially impervious to fuel contaminants and degradation.

To prevent or substantially reduce radio frequency interference with the operation of electronic drive module 30, the exterior surface 96 of outer layer 94 is metallized to block radio frequencies and prevent extraneous signals from interfering with the drive module function. In a preferred embodiment, the metallized outer surface 96 is produced by adding metal flakes to the thermoplastic material prior to the injection molding process so that they become embedded in the cooled and hardened outer layer 94.

After casing 90 is completely formed around the drive module components, the completed module 30 is attached to the fuel pump as previously described. By attaching the electronic drive module 30 directly to fuel pump assembly 10, wires running from the drive module to the fuel pump are eliminated, thereby eliminating the antenna effect of the wires which further reduces radio frequency interference with the functioning of the drive module. Fuel pump assembly 10, as shown in FIG. 1, is then ready for installation in a reservoir container and a fuel tank for delivering fuel to an engine.

FIGS. 1–7 illustrate a preferred embodiment of the present invention. Although the invention has been described in conjunction with the presently preferred embodiment thereof illustrated in the drawings, it will be appreciated that many alternatives and modifications may be implemented without departing from the principles of this invention. For example, heat sink 60 and fuel passage 72 can take on a number of shapes and configurations without departing from the scope of the invention. The heat sink may be constructed from alternative materials such as brass or copper. Circuit board assembly 40 and the components attached thereto may take on numerous configurations and constructions and yet remain within the scope of this invention. Casing 90 could be constructed of a single layer of material and not depart from the present invention. Inner layer 92 and outer layer 94 may also be constructed of numerous alternative materials without departing from the principles of this invention. Outer metallized surface 96 may be a plating on casing 90, vacuum metallized onto casing 90, a separate stamped metal housing surrounding drive module 30, or sprayed onto the injection die before molding the outer layer 94 and transferred onto the outer layer during injection molding. Many types of electrically powered fuel pumps may be employed. Various drive module circuit configurations producing pump drive current in a variety of output modes may also be employed.

What is claimed is:

1. A submersible electronic drive module for a vehicle in-tank fuel pump comprising, a circuit board assembly having an input connection for receiving an electric current, an output connection for applying electric power to an electric motor of a fuel pump and electrical components for supplying electric power to the motor, a heat sink constructed from a body of heat conductive material connected to said circuit board assembly for absorbing heat generated by said circuit board assembly, a fuel passage in heat transfer relationship with said heat sink and having an inlet communicating with the fuel pump outlet and an outlet for fuel delivery, such that fuel passing through said passage absorbs heat from said heat sink and thus said circuit board assembly, an attachment for removably connecting said drive module to the fuel pump, and a fuel-impervious casing substantially encapsulating said drive module such that fuel is prevented from contacting said circuit board assembly.

2. A submersible electronic drive module for a vehicle in-tank fuel pump comprising,

- a circuit board assembly having an input connection for receiving an electric current, an output connection for applying electric power to an electric motor of a fuel pump and electrical components for supplying electric power to the motor,
- a heat sink constructed from a body of heat conductive material connected to said circuit board assembly for absorbing heat generated by said circuit board assembly,
- a fuel passage in heat transfer relationship with said heat sink and having an inlet communicating with the fuel pump outlet and an outlet for fuel delivery, such that fuel passing through said passage absorbs heat from said heat sink and thus said circuit board assembly,
- an attachment for removably connecting said drive module to the fuel pump, and
- a fuel-impervious casing substantially encapsulating said drive module such that fuel is prevented from contacting said circuit board assembly,
- said casing having an inner layer and an outer layer of material wherein said inner layer substantially encapsulates said drive module and said outer layer substantially encapsulates said drive module and said inner layer.

3. The drive module of claim 2 wherein said inner layer comprises an elastomeric material molded around said drive module.

4. The drive module of claim 3 wherein said elastomeric material is flourosilicone.

5. The drive module of claim 2 wherein said outer layer comprises a thermoplastic material molded around said drive module and said inner layer.

6. The drive module of claim 5 wherein said thermoplastic material is an injection molded fuel resistant nylon.

7. The drive module of claim 5 wherein said thermoplastic material is a fuel resistant acetyl.

8. The drive module of claim 2 wherein said casing also comprises a means for suppressing radio frequency interference with said drive module.

9. The drive module of claim 8 wherein said means for suppressing radio frequency interference with said drive module comprises a metallized outer surface on said casing.

10. The drive module of claim 9 wherein said metallized outer surface comprises metal flakes embedded in said outer layer of material.

11. A submersible electronic drive module for a vehicle in-tank fuel pump comprising,

- a circuit board assembly having an input connection for receiving an electric current, an output connection for applying electric power to an electric motor of a fuel pump and electrical components for supplying electric power to the motor,
- a heat sink constructed from a body of heat conductive material connected to said circuit board assembly for absorbing heat generated by said circuit board assembly,
- a fuel passage in heat transfer relationship with said heat sink having an inlet communicating with a fuel pump outlet and an outlet for fuel delivery, such that fuel passing through said passage absorbs heat from said heat sink and thus said circuit board assembly,
- an attachment for removably connecting said dive module to the fuel pump,
- a fuel-impervious casing substantially encapsulating said drive module such that fuel is prevented from contacting said circuit board assembly, said casing having an inner layer constructed from an elastomeric material and an outer layer constructed from a thermoplastic material wherein said inner layer substantially encapsulates said drive module and said outer layer substantially encapsulates said drive module and said inner layer, and
- a metallized outer surface on said casing for suppressing radio frequency interference with said drive module.

12. The drive module of claim 11 wherein said metallized outer surface comprises metal flakes embedded in said outer layer of thermoplastic material.

* * * * *

UNITED STATES PATENT AND TRADEMARK OFFICE
CERTIFICATE OF CORRECTION

PATENT NO. : 5,613,844
DATED : March 25, 1997
INVENTOR(S) : Charles H. Tuckey et al It is certified that error appears in the above-indentified patent and that said Letters Patent is hereby corrected as shown below:

Column 6, Line 25, change "dive" to "drive".

Signed and Sealed this

Eighth Day of July, 1997

Attest:

BRUCE LEHMAN

*Attesting Officer*     *Commissioner of Patents and Trademarks*